United States Patent
Ito

(10) Patent No.: US 8,320,754 B2
(45) Date of Patent: Nov. 27, 2012

(54) ELECTRONIC CAMERA

(75) Inventor: Kentaro Ito, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 12/777,479

(22) Filed: May 11, 2010

(65) Prior Publication Data

US 2010/0290772 A1    Nov. 18, 2010

(30) Foreign Application Priority Data

May 15, 2009    (JP) ................................ 2009-118211

(51) Int. Cl.
G03B 17/00    (2006.01)
G02B 15/14    (2006.01)
(52) U.S. Cl. .......................................... 396/79; 359/698
(58) Field of Classification Search .................... 396/79; 359/696–698

See application file for complete search history.

(56) References Cited

U.S. PATENT DOCUMENTS

| 5,281,796 A * | 1/1994 | Kaneda et al. ............. 250/201.2 |
| 2005/0254141 A1 * | 11/2005 | Suzuki et al. ................. 359/696 |
| 2006/0056059 A1 * | 3/2006 | Ozawa .......................... 359/694 |
| 2006/0120709 A1 * | 6/2006 | Kobayashi ..................... 396/80 |

FOREIGN PATENT DOCUMENTS

| JP | 5-232364 A | 9/1993 |
| JP | 6-350890 A | 12/1994 |
| JP | 2001-208954 A | 8/2001 |
| JP | 2003-140025 A | 5/2003 |

* cited by examiner

Primary Examiner — Clayton E Laballe
Assistant Examiner — Noam Reisner
(74) Attorney, Agent, or Firm — Westerman, Hattori, Daniels & Adrian, LLP

(57) ABSTRACT

An electronic camera includes an imager. The imager includes an imaging surface capturing an object scene image through a zoom lens and a focus lens. When accepting a zoom instruction, a first changer changes a distance from the zoom lens to the imaging surface. With reference to a tracking curve, a second changer executes a process for changing the distance from the focus lens to the imaging surface, in parallel with the change process executed by the first changer. A limiter limits the change process of the second changer when a change manner by the first changer satisfies a predetermined condition.

15 Claims, 9 Drawing Sheets

ELECTRONIC CAMERA

CROSS REFERENCE OF RELATED APPLICATION

The disclosure of Japanese Patent Application No. 2009-118211, which was filed on May 15, 2009, is incorporated herein by reference.

BACKGROUND OF THE INVENTION

1. Field of the Invention

The present invention relates to an electronic camera. More particularly, the present invention relates to an electronic camera which executes a process for adjusting a distance from a focus lens to an imaging surface in parallel with a zoom adjusting process.

2. Description of the Related Art

According to one example of this type of camera, a zoom moving range is divided into four parts, and one pan focus position is assigned to each of the divided moving ranges. When a zoom lens is driven, the moving range to which the zoom lens belongs is repeatedly detected. A focus lens is placed at a pan focus position corresponding to the detected moving range. Thereby, when a zoom manipulation is performed in the middle of a moving image photographing, it is possible to appropriately adjust a focus.

However, when the zoom lens is driven, the focus lens is remained and placed at the pan focus position. Thus, in the above-described camera, the focus adjusting process performed in parallel with the zoom adjusting process has a limit to its capability.

SUMMARY OF THE INVENTION

An electronic camera according to the present invention, comprises: an imager having an imaging surface capturing an object scene image through a zoom lens and a focus lens; a first changer which changes a distance from the zoom lens to the imaging surface when accepting a zoom instruction; a second changer which executes a process for changing the distance from the focus lens to the imaging surface by referring to a tracking curve, in parallel with a change process of the first changer; and a limiter which limits the change process of that second changer when a change manner performed by that first changer satisfies a predetermined condition.

A focal control program product according to the present invention is a focal control program product executed by a processor of an electronic camera provided with an imager having an imaging surface capturing an object scene image through a zoom lens and a focus lens, and comprises: a first changing step of changing a distance from the zoom lens to the imaging surface when accepting a zoom instruction; a second changing step of executing a process for changing the distance from the focus lens to the imaging surface by referring to a tracking curve, in parallel with the change process in the first changing step; and a limiting step of limiting the change process in the second changing step when a change manner performed in the first changing step satisfies a predetermined condition.

A focal control method according to the present invention is a focal control method executed by an electronic camera provided with an imager having an imaging surface capturing an object scene image through a zoom lens and a focus lens, and comprises: a first changing step of changing a distance from the zoom lens to the imaging surface when accepting a zoom instruction; a second changing step of executing a process for changing the distance from the focus lens to the imaging surface by referring to a tracking curve, in parallel with the change process in said first changing step; and a limiting step of limiting the change process in said second changing step when a change manner performed in said first changing step satisfies a predetermined condition.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
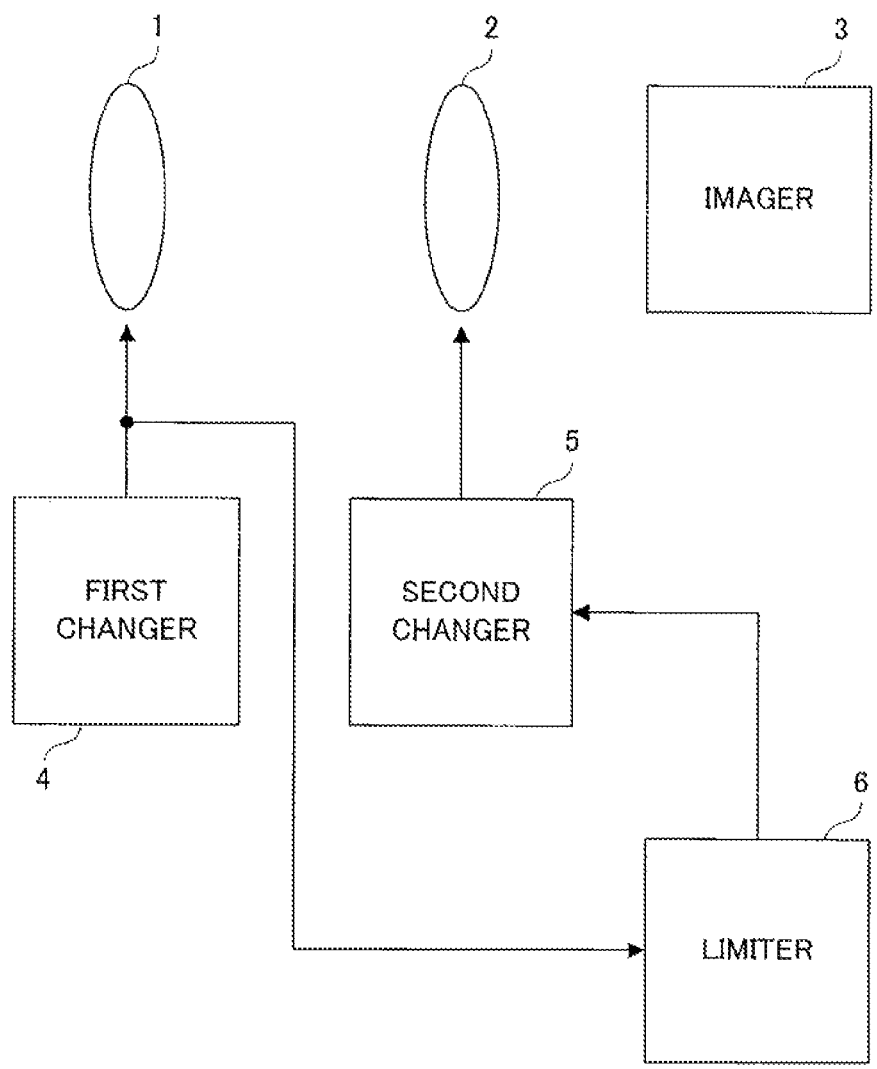
FIG. 1 is a block diagram showing a basic configuration of the present invention.

With reference to FIG. 1, an electronic camera according to the present invention is basically configured as follows: An imager 3 includes an imaging surface capturing an object scene image through a zoom lens 1 and a focus lens 2. When accepting a zoom instruction, a first changer 4 changes a distance from the zoom lens 1 to the imaging surface. With reference to a tracking curve, a second changer 5 executes a process for changing the distance from the focus lens 2 to the imaging surface, in parallel with the change process executed by the first changer 4. A limiter 6 limits the change process of the second changer 5 when a change manner by the first changer 4 satisfies a predetermined condition.

Therefore, unless the manner of changing the distance from the zoom lens 1 to the imaging surface satisfies the predetermined condition, then the distance from the focus lens 2 to the imaging surface is adjusted with reference to the tracking curve. On the other hand, if the manner of changing the distance from the zoom lens 1 to the imaging surface satisfies the predetermined condition, then such a distance adjusting process is limited.

When a focus is adjusted with reference to the tracking curve, a focus accuracy is secured. Also, when a focus adjusting process performed by referring to the tracking curve is limited when the predetermined condition is satisfied, a defocus resulting from an erroneous selection of the tracking curve is avoided. This improves a capability of the focus adjusting process performed in parallel with the zoom adjusting process.

Figure 2:
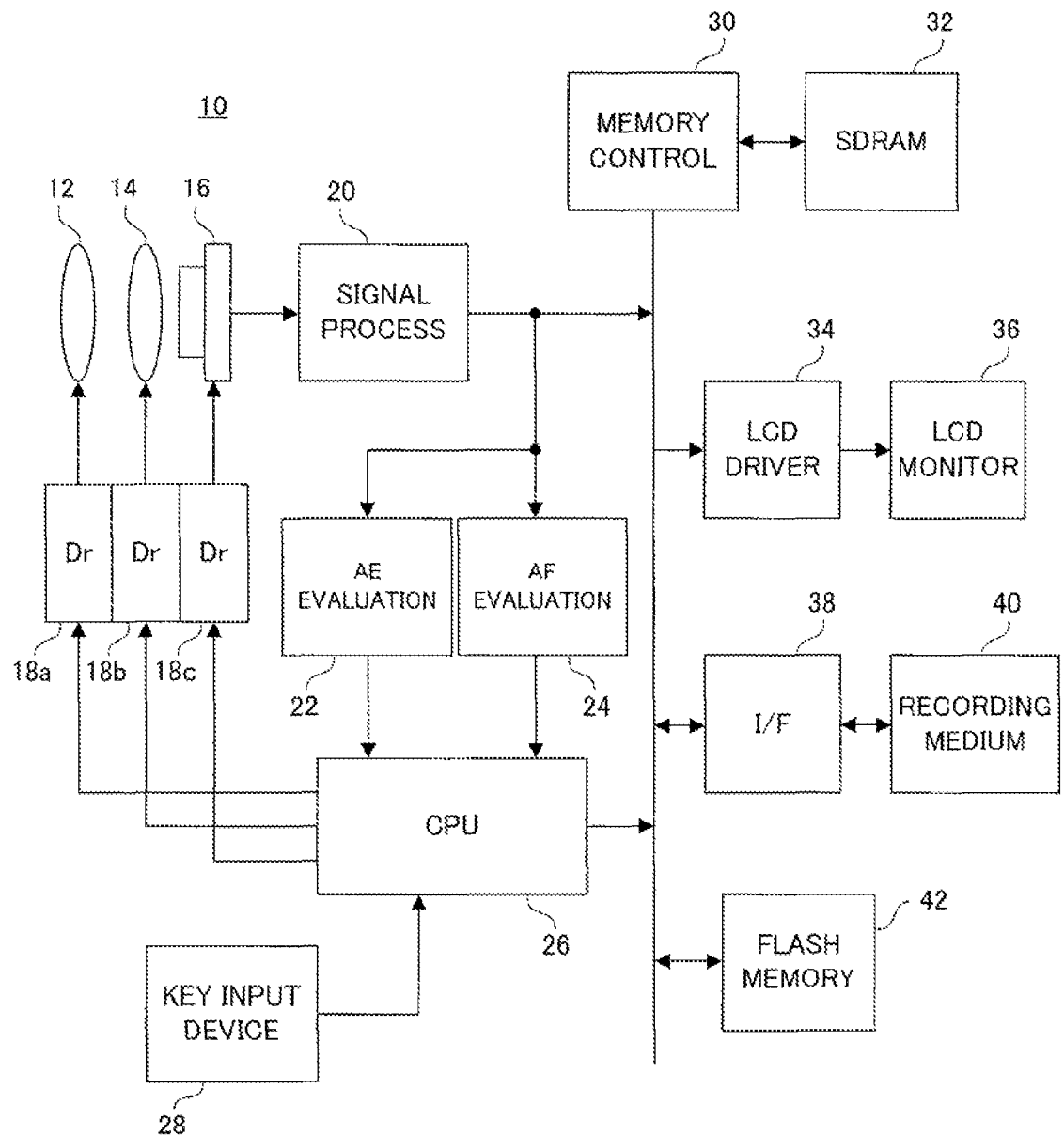
FIG. 2 is a block diagram showing a configuration of one embodiment of the present invention.

With reference to FIG. 2, a digital video camera 10 according to this embodiment includes a zoom lens 12 and a focus lens 14 driven by drivers 18a and 18b, respectively. An optical image of an object scene enters, with irradiation, an imaging surface of an image sensor 16 through the zoom lens 12 and the focus lens 14, and photoelectrically converted. Thereby, electric charges representing an object scene image are produced on the imaging surface.

When a power supply is inputted, a CPU 26 places the zoom lens 12 at a wide end under an imaging task, and starts a driver 18c for a purpose of a moving-image fetching process. In response to a vertical synchronization signal Vsync generated at every 1/60 seconds, the driver 18c exposes the imaging surface and reads out the electric charges produced on the imaging surface in a raster scanning manner. From the image sensor 16, raw image data representing the object scene is outputted at a frame rate of 60 fps.

A signal processing circuit 20 performs processes, such as white balance adjustment, color separation, and YUV conversion, on raw image data outputted from the imaging sensor 16, and writes YUV formatted-image data created thereby into an SDRAM 32 through a memory control circuit 30. An LCD driver 34 reads out the image data accommodated in the SDRAM 32, through the memory control circuit 30, and drives an LCD monitor 36 based on the read-out image data. As a result, a real-time moving image (through image) of the object scene is displayed on a monitor screen.

When a recording start-up manipulation is performed by a key input device 28, the CPU 26 commands an I/F 38 to start up a recording process. Through the memory control circuit 30, the I/F 38 reads out the image data accommodated in the SDRAM 32, from the SDRAM 32, and creates a moving-image file including the read-out image data, in a recording medium 40. When a recording end manipulation is performed by the key input device 28, the CPU 26 commands the I/F 38 to end the recording process. The I/F 38 ends reading out the image data from the SDRAM 32, and closes the moving-image file of a recording destination.

An AE evaluating circuit 22 defines, as an AE area, a whole evaluation area (not shown) assigned to the imaging surface, and in response to the vertical synchronization signal Vsync, integrates Y data belonging to the AE area, out of Y data outputted from the signal processing circuit 20. An integral value is outputted, as an AE evaluation value, from the AE evaluating circuit 22 at each generation of the vertical synchronization signal Vsync. The CPU 26 adjusts an exposure amount of the image sensor 16 based on the AE evaluation value outputted from the AE evaluating circuit 22. As a result, a brightness of the through image displayed on the LCD monitor 36 is moderately adjusted.

When a zoom manipulation is executed by the key input device 28, the CPU 26 moves the zoom lens 12 in a designated direction. As a result, a magnification of the through image displayed on the LCD monitor 36 is changed.

Figure 3:
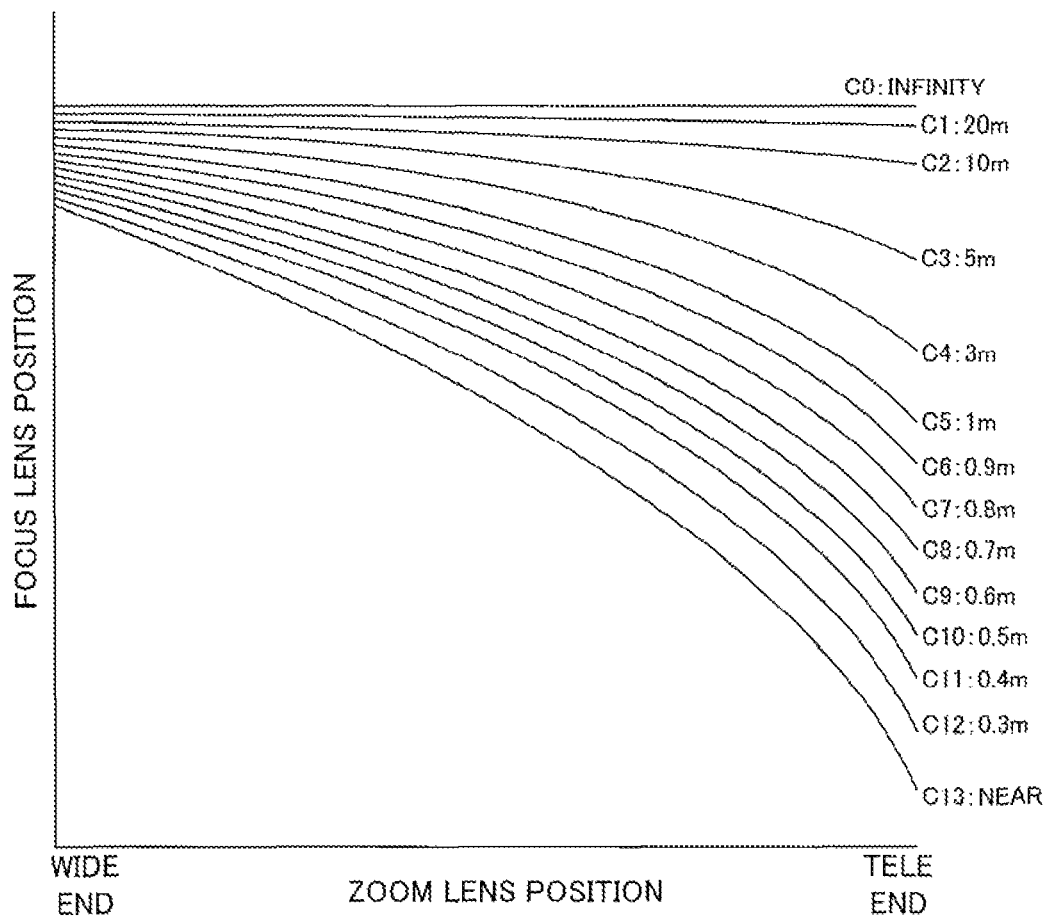
FIG. 3 is a graph showing one example of a plurality of tracking curves respectively corresponding to a plurality of different depths of field.

In a flash memory 42, graph data equivalent to tracking curves C0 to C13 shown in FIG. 3 are stored. With reference to FIG. 3, when a depth of field is "infinite", a focal position changes in a manner to move along the tracking curve C0 relative to a position of the zoom lens 12. Moreover, when the depth of field is "20 m", the focal position changes in a manner to move along the tracking curve C1 relative to the position of the zoom lens 12. Furthermore, when the depth of field is "10 m", the focal position changes in a manner to move along the tracking curve C2 relative to the position of the zoom lens 12.

Likewise, when the depths of field are "5 m", "3 m", "1 m", "0.9 m", "0.8 m", "0.7 m", "0.6 m", "0.5 m", "0.4 m", "0.3 m", and "nearest end", the focal positions change in a manner to move along the tracking curves C3, C4, C5, C6, C7, C8, C9, C10, C11, C12, and C13 relative to the position of the zoom lens 12, respectively.

The CPU 26 firstly sets a reference tracking curve to "C0" under a focus control task, and refers to the tracking curve C0 so as to adjust the position of the focus lens 14. Because the zoom lens 12 is initially placed at a wide end, the focus lens 14 is placed at a position corresponding to the wide end on the tracking curve C0.

While no zoom manipulation is performed, it is repeatedly determined whether or not an AF starting condition (condition under which the AF evaluation value falls below a reference) is satisfied. When the AF starting condition is satisfied, a hill-climbing AF process is executed.

In association with the hill-climbing AF process, an AF evaluating circuit 24 defines, as an AF area, a whole or part of the evaluation area, and in response to the vertical synchronization signal Vsync, integrates a high-frequency component of Y data belonging to the AF area, out of Y data outputted from the signal processing circuit 20. The integral value is outputted, as an AF evaluation value, from the AF evaluating circuit 24 at each generation of the vertical synchronization signal Vsync.

The CPU 26 gradually moves the focus lens 14 in an optical-axis direction, and searches a position at which the AF evaluation value is maximum. When the position corresponding to a maximum AF evaluation value is detected, the CPU 26 regards the detected position as the focal position and places the focus lens 14 at the detected focal position.

Upon completion of such a bill-climbing AF process, the CPU 26 detects coordinates equivalent to current positions of the zoom lens 12 and the focus lens 14, from the graph shown in FIG. 3, specifies one tracking curve passing on the detected coordinates or two tracking curves sandwiching the detected coordinates, from among the tracking curves C0 to C13, and updates the reference tracking curve to the specified tracking curve(s). Therefore, if the detected coordinates are (Zs, Fs) shown in FIG. 4, then the tracking curves C3 and C4 are selected as the reference tracking curve.

When the zoom manipulation is performed, a focus tracking process is executed. The focus lens 14 moves in the optical-axis direction in a manner to move along the reference tracking curve. If the moving direction of the zoom lens 12 is a tele side, then a process for adding up moving amounts of the zoom lens 12 is executed in parallel with the focus tracking process. A variable ΣZM indicating an added-up value of moving amounts of the zoom lens 12 increases by each "ΔZM" equivalent to a single moving amount of the zoom lens 12.

When the variable ΣZM exceeds a threshold value TH, the CPU 26 changes the reference tracking curve to "C1". In the focus tracking process executed after the change, the focus lens 14 moves in an optical-axis direction in a manner to run along the tracking curve C1.

Figure 4:
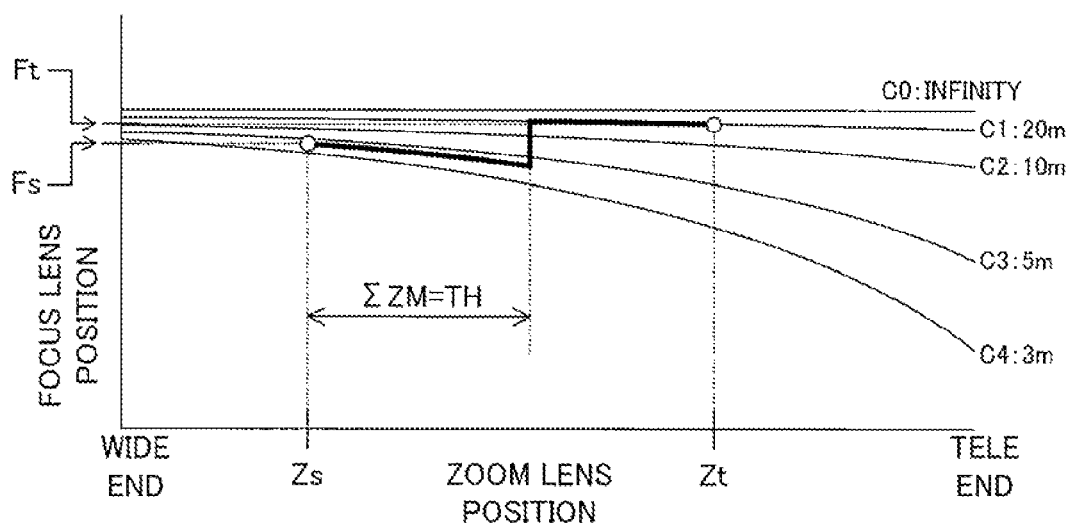
FIG. 4 is a graph showing one example of a focus tracking operation.

Therefore, when the zoom lens 12 is moved from "Zs" to "Zt" shown in FIG. 4, the focus lens 14 moves in a manner to run along the tracking curves C3 and C4 in a period during which the variable ΣZM falls below the threshold value TH while in a period during which the variable ΣZM is equal to or more than the threshold value TH, the focus lens 14 moves in a manner to run along the tracking curve C1. When the zoom lens 12 reaches "Zt", the focus lens 14 is placed at "Ft".

Thus, unless a moving manner of the zoom lens 12 satisfies a predetermined condition (condition under which the moving direction is the tele direction and the moving amount exceeds the threshold value TH), the position of the focus lens 14 is adjusted with reference to the tracking curve. Thereby, a high focus accuracy is maintained. On the other hand, when the moving manner of the zoom lens 12 satisfies the predetermined condition, the focus tracking process in which the trading curve is referred to is limited. Thereby, a defocus resulting from an erroneous selection of the tracking curve is avoided.

Such a focus adjustment facilitates framing performed after the zoom manipulation. Moreover, a frequency at which the hill-climbing AF process is started after the zoom manipulation is inhibited, and as a result, a reduction in power consumption is achieved.

Figure 5:
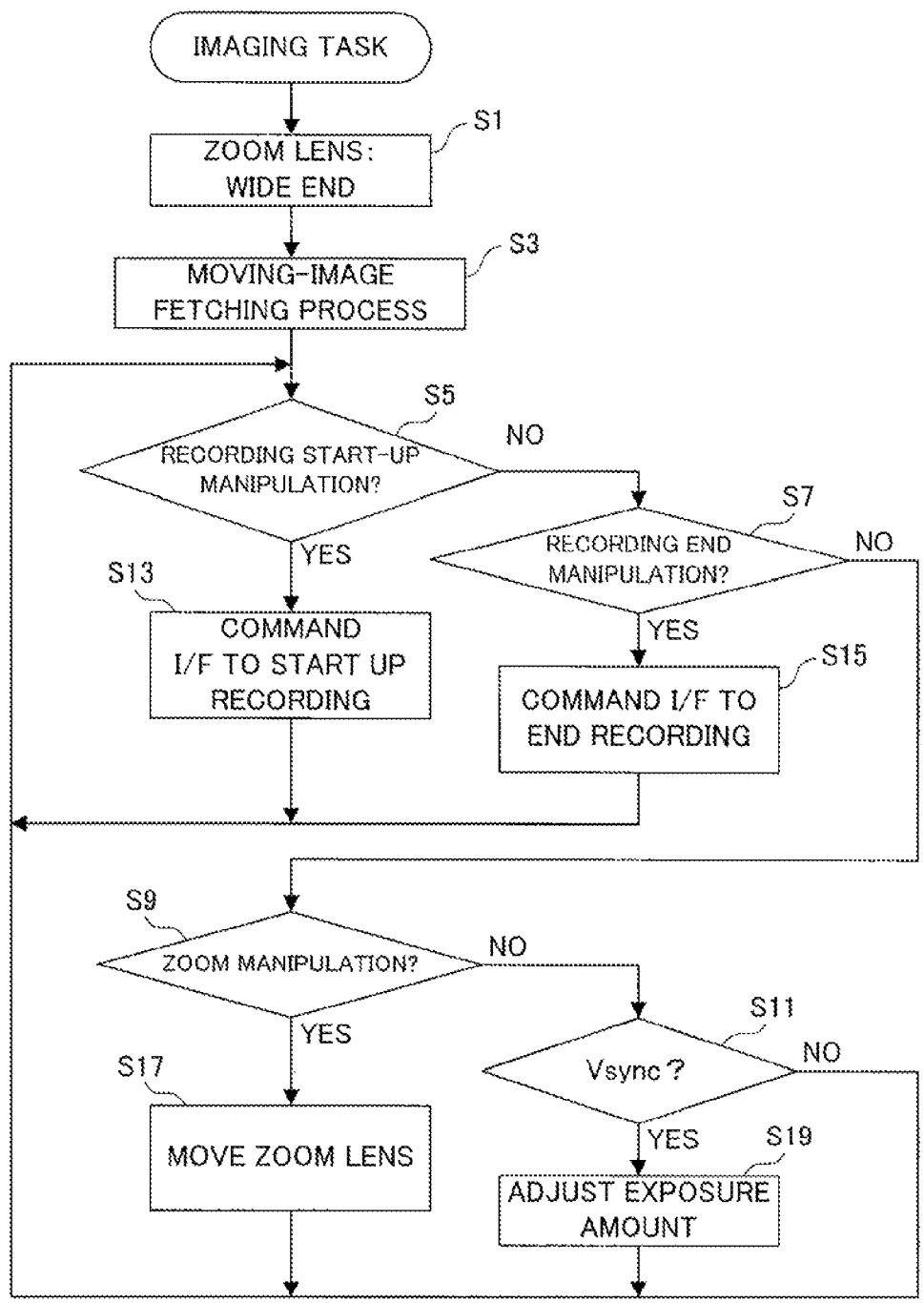
FIG. 5 is a flowchart showing one portion of an operation of a CPU applied to the embodiment in FIG. 2.
Figure 6:
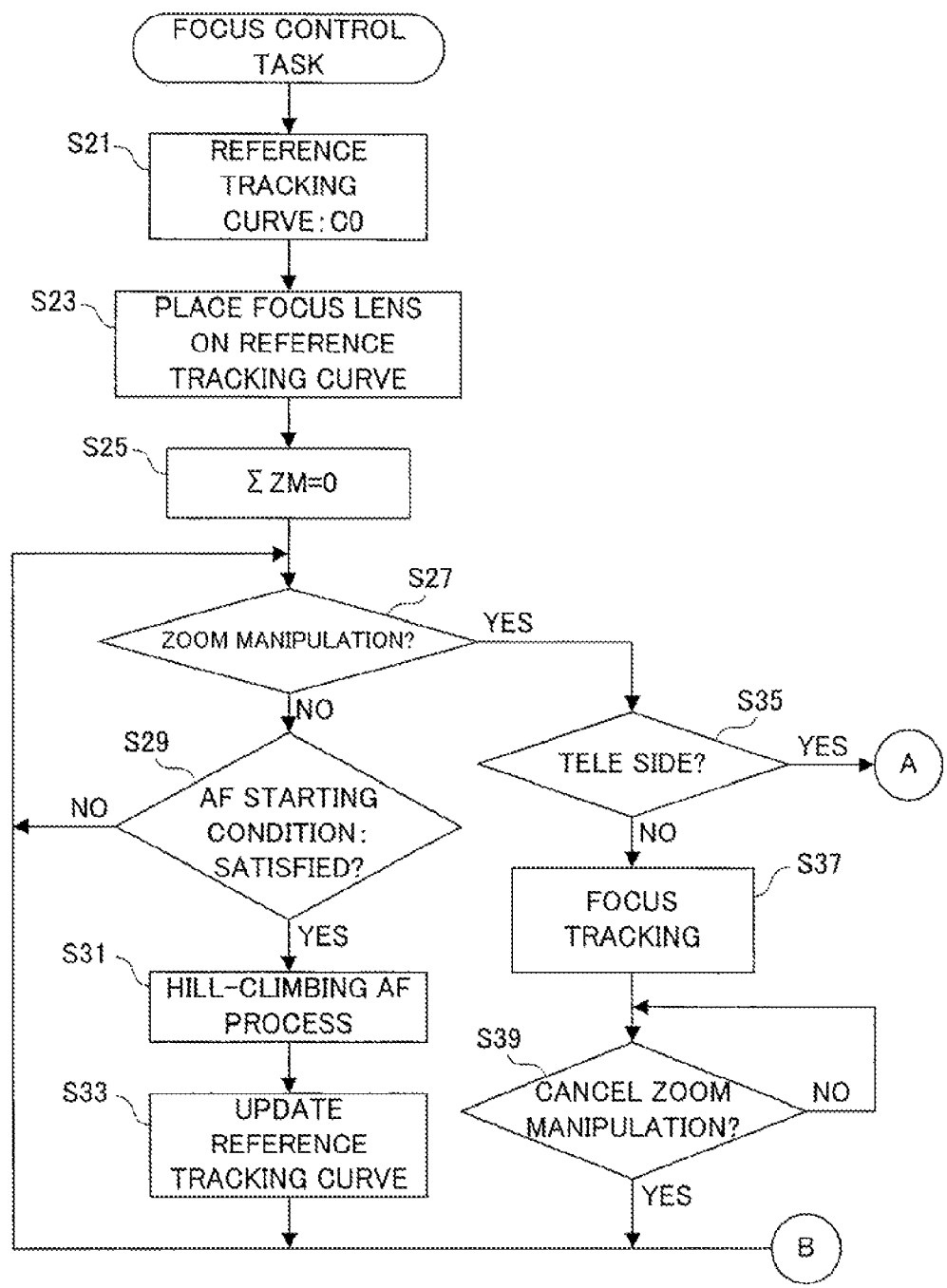
FIG. 6 is a flowchart showing another portion of the operation of the CPU applied to the embodiment in FIG. 2.
Figure 7:
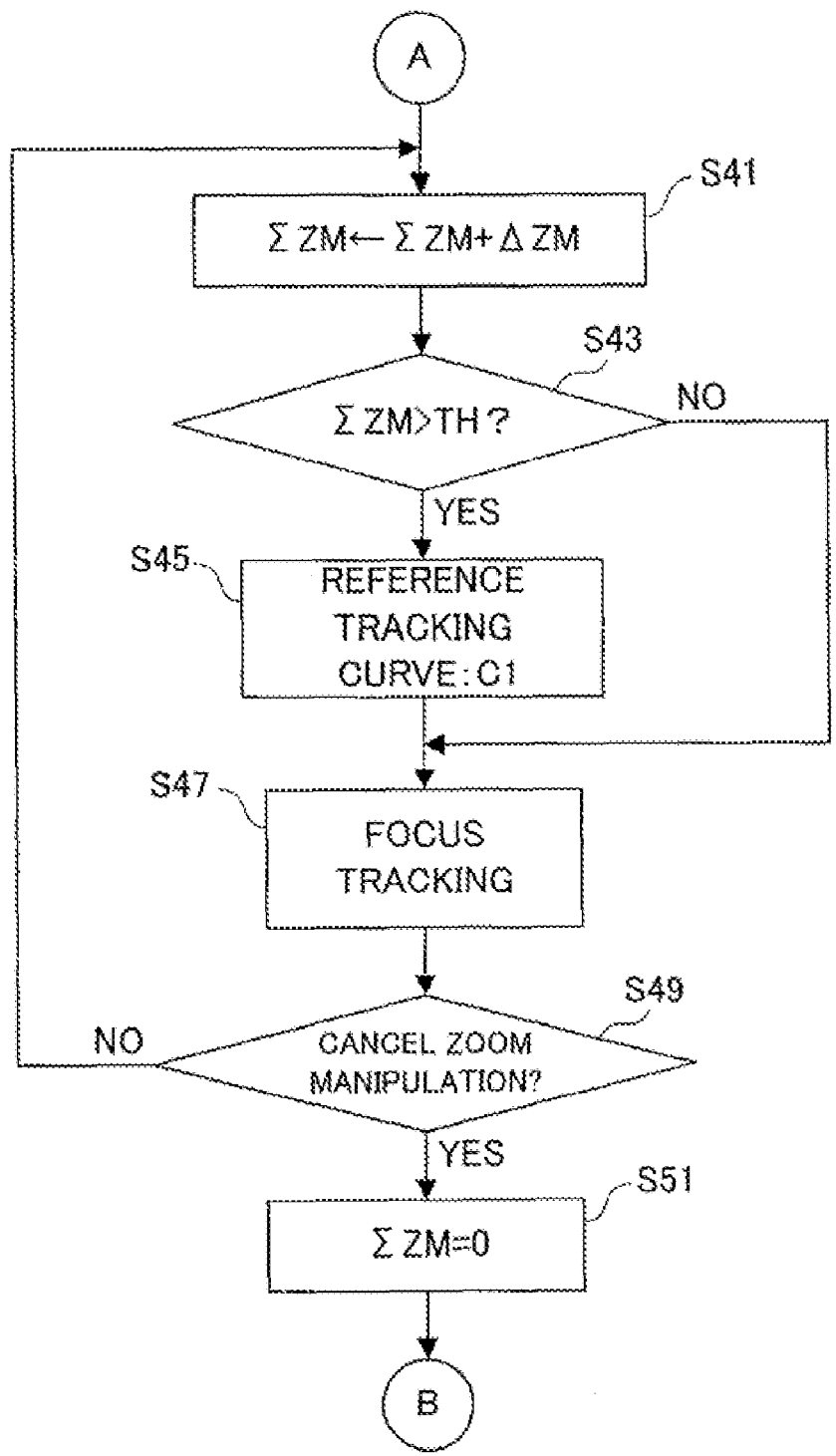
FIG. 7 is a flowchart showing still another portion of the operation of the CPU applied to the embodiment in FIG. 2.

The CPU 26 executes in parallel a plurality of tasks including an imaging task shown in FIG. 5 and a focus control task shown in FIG. 6 to FIG. 7. It is noted that control programs corresponding to these tasks are stored in the flash memory 42.

With reference to FIG. 5, in a step S1, the zoom lens 12 is placed at the wide end, and in a step S3, a moving-image fetching process is executed. As a result, a through image having a zoom magnification of 1.0 time is displayed on the LCD monitor 36. In a step S5, it is determined whether or not the recording start-up manipulation is performed, and in a step S7, it is determined whether or not the recording end manipulation is performed. Furthermore, in a step S9, it is determined whether or not the zoom manipulation is performed, and in a step S11, it is determined whether or not the vertical synchronization signal Vsync is generated.

When YES is determined in the step S5, the process advances to a step S13 so as to command the I/F 38 to start up the recording process. When YES is determined in the step S7, the process advances to a step S15 so as to command the I/F 38 to end the recording process. When YES is determined in the step S9, the process advances to a step S17 so as to move the zoom lens 12 in a designated direction. When YES is determined in the step S11, the process advances to a step S19, and an exposure amount of the image sensor 16 is adjusted based on the AE evaluation value outputted from the AE evaluating circuit 22.

With reference to FIG. 6, in a step S21, the reference tracking curve is set to "C0", and in a step S23, the focus lens 14 is placed at a position corresponding to the wide end on the tracking curve C0. Upon completion of the process in the step S23, the process advances to a step S25 so as to set the variable $\Sigma ZM$ to "0".

In a step S27, it is determined whether or not the zoom manipulation is performed, and when NO is determined, it is determined in a step S29 whether or not the AF starting condition (condition tinder which the AF evaluation value falls below the reference) is satisfied. When the AF starting condition is not satisfied, the process returns to the step S27, and when the AF starting condition is satisfied, the hill-climbing AF process is executed in a step S31. The focus lens 14 is placed at the focal position by the hill-climbing AF process.

In a step S33, the coordinates equivalent to the current positions of the zoom lens 12 and the focus lens 14 are detected from the graph shown in FIG. 3, one tracking curve passing the detected coordinates or the two tracking curves sandwiching the detected coordinates are specified from among the tracking curves C0 to C13, and the reference tracking curve is updated to the specified tracking curve(s). Upon completion of the updating process, the process returns to the step S27.

When YES is determined in the step S27, it is determined in a step S35 whether the moving direction of the zoom lens 12 is the tele side or the wide side. When the moving direction of the zoom lens 12 is the wide side, the focus tracking process is executed in a step S37. The focus lens 14 moves in the optical-axis direction in a manner to move along the reference tracking curve. In a step S39, it is determined whether or not the zoom manipulation is canceled, and when a determination result is updated from NO to YES, the process returns to the step S27.

If the moving direction of the zoom lens 12 is the tele side, then the process advances from the step S35 to a step S41 and adds "$\Delta ZM$" to the variable $\Sigma ZM$. In a step S43, it is determined whether or not the variable $\Sigma ZM$ exceeds the threshold value TH. When a determination result is YES, the process changes the reference tracking curve to "C1" in a step S45, and then, advances to a step S47 while when the determination result is NO, the process directly advances to the step S47. In the step S47, a focus tracking process similar to that executed in the step S37 is executed, and in a step S49, it is determined whether or not the zoom manipulation is canceled. When the determination result is NO, the process returns to the step S41, and when the determination result is YES, the process sets added-up moving amounts $\Sigma ZM$ to "0" in a step S51, and then, returns to the step S27.

As can be seen from the above-described explanation, the image sensor 16 has an imaging surface capturing an object scene image through the zoom lens 12 and the focus lens 14. When accepting the zoom instruction, the CPU 26 moves the zoom lens 12 in a designated direction (S9, S17), and in parallel therewith, moves the focus lens 14 in a focal direction (S37, S47). The process for moving the focus lens 14 is executed with reference to the tracking curve. It is noted that when the moving manner of the zoom lens 12 satisfies the predetermined condition (condition under which the moving direction is the tele direction and the moving amount exceeds the threshold value TH), the CPU 26 limits the process for moving the focus lens 14 (S43, S45).

Therefore, unless the moving manner of the zoom lens 12 satisfies the predetermined condition, the position of the focus lens 14 is adjusted with reference to the tracking curve. On the other hand, when the moving manner of the zoom lens 12 satisfies the predetermined condition, such a focus adjusting process is limited.

When the focus is adjusted with reference to the tracking curve, the focus accuracy is secured. Also, when the focus adjusting process that refers to the tracking curve is limited when the predetermined condition is satisfied, the defocus resulting from an erroneous selection of the tracking curve is avoided. Thus, a capability of the focus adjusting process in parallel with the zoom adjusting process is improved.

Figure 8:
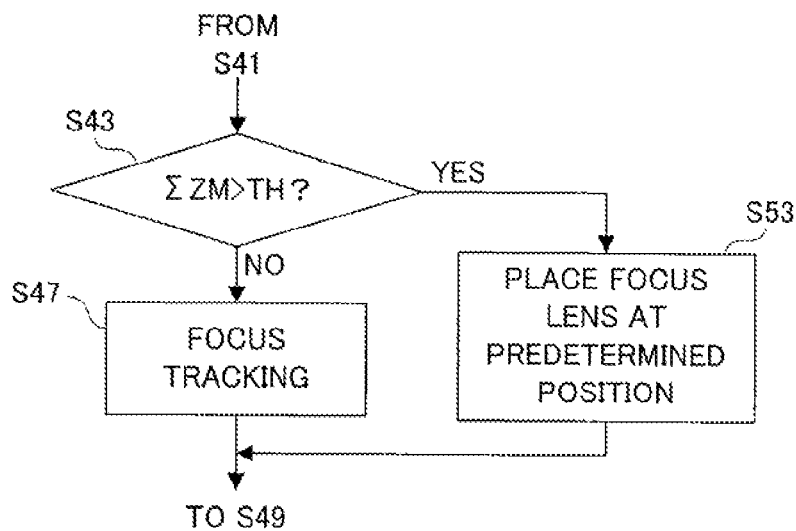
FIG. 8 is a flowchart showing one portion of an operation of a CPU applied to another embodiment.

It is noted that in this embodiment, at a time point at which the variable $\Sigma ZM$ exceeds the threshold value TH, the reference tracking curve is changed to "C1". However, instead thereof the following may be possible: the focus lens 14 is moved to a predetermined position (pan focus position) at a time point at which the variable $\Sigma ZM$ exceeds the threshold value TH; or the movement of the focus lens 14 is prohibited at a time point at which the variable $\Sigma ZM$ exceeds the threshold value TH. In the former; a process shown in FIG. 8 is preferably executed alternately. In the latter, a process shown in FIG. 10 is preferably executed alternately.

Figure 9:
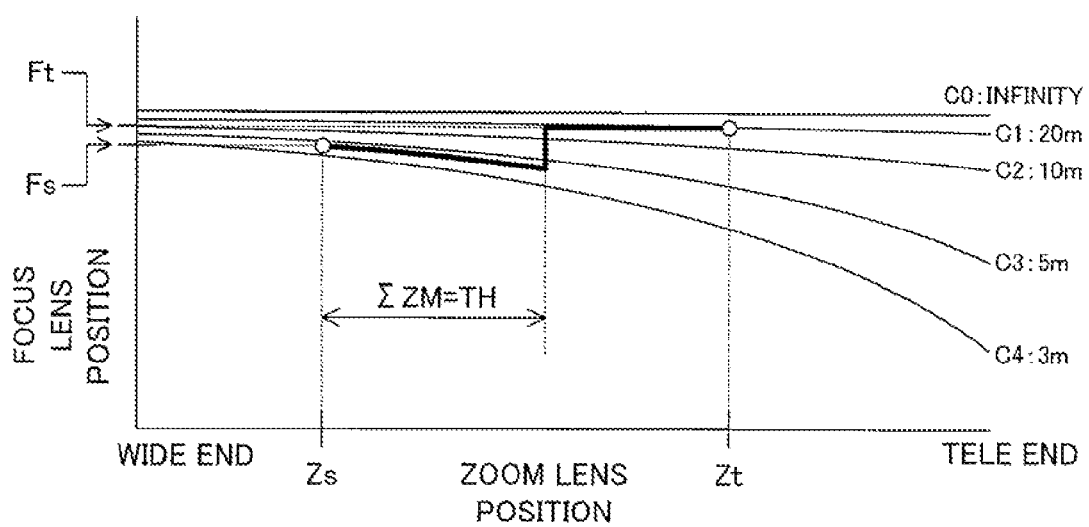
FIG. 9 is a graph showing another example of the focus tracking operation.

According to the process in FIG. 8, the process in the step S45 is omitted. Moreover, when YES is determined in the step S43, the process advances to a step S53 so as to place the focus lens 14 at the predetermined position. Upon completion of the process in the step S53, the process advances to the step S49. Therefore, when the predetermined position is "Ft", if the zoom lens 12 is moved from "Zs" to "Zt", then the focus lens 14 is displaced in a manner to run along a bold line shown in FIG. 9.

Figure 10:
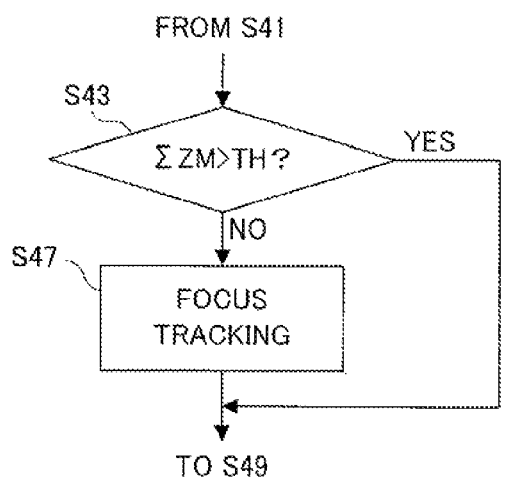
FIG. 10 is a flowchart showing one portion of an operation of a CPU applied to still another embodiment.
Figure 11:
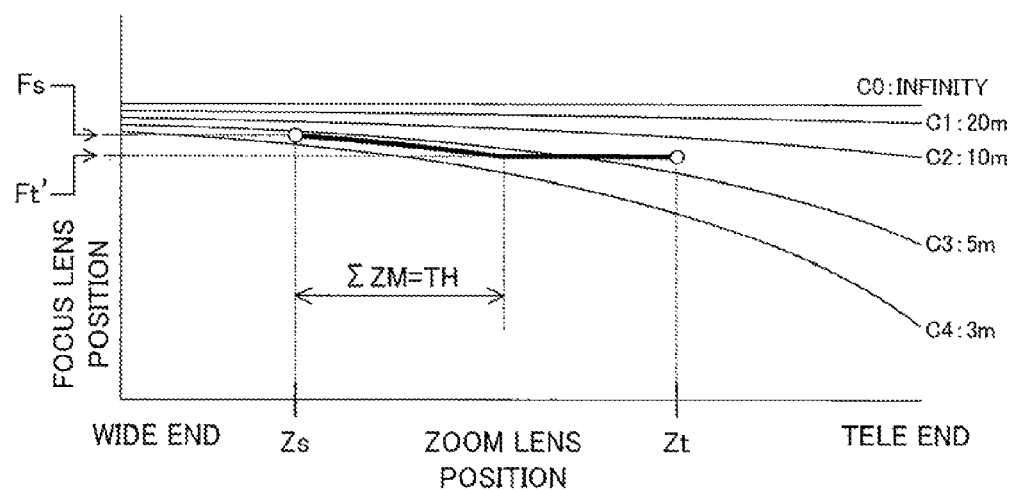
FIG. 11 is a graph showing another example of the focus tracking operation.

Furthermore, according to the process in FIG. 10, when YES is determined in the step S43, the process advances to the step S49 without passing through the process in the step S47. Therefore, when the zoom lens 12 is moved from "Zs" to "Zt", the focus lens 14 is displaced in a manner to run along a bold line shown in FIG. 11. That is, the focus lens 14 remains stationary at "Ft'" at a time point at which the variable ΣZM exceeds the threshold value TH.

It is noted that in this embodiment, when the focus is adjusted, the focus lens 14 is moved in the optical-axis direction; however, together with the focus lens 14 or instead of the focus lens 14, the imaging surface may be moved in the optical-axis direction.

Moreover, in this embodiment, the moving image is recorded in a recording medium; however, instead of the moving image or in addition to the moving image, a still image may be optionally recorded in the recording medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager having an imaging surface which captures a scene through a zoom lens and a focus lens;
   a first changer which changes a distance from the zoom lens to the imaging surface in response to a zoom operation by an operator;
   a second changer which executes a process of changing the distance from the focus lens to the imaging surface by referring to a tracking curve, in parallel with a changing process of said first changer;
   a limiter which limits a changing process of said second changer when a changing amount by said first changer has exceeded a threshold value;
   an adjustor which adjusts the distance from the focus lens to the imaging surface into a distance equivalent to a focal point based on an image outputted from said imager after the zoom operation has been cancelled; and
   an updater which updates the tracking curve to be referred to by said second changer based on the distance defined by said first changer and the distance defined by said adjuster, wherein said limiter includes an accumulator which accumulates the changing amount in parallel with the changing process of said first changer, and a comparer which compares an accumulated value calculated by said accumulator with the threshold value.

2. An electronic camera according to claim 1, wherein said updater executes an updating process after an adjusting process of said adjuster is completed.

3. An electronic camera according to claim 1, wherein said updater selects a tracking curve suitable for the distances from among a plurality of tracking curves respectively corresponding to a plurality of depths of field.

4. An electronic camera according to claim 1, wherein the tracking curve is equivalent to a curve being plotted on a plane in which the distance from the zoom lens to the imaging surface is rendered as a first coordinate axis and the distance from the focus lens to the imaging surface is rendered as a second coordinate axis.

5. An electronic camera according to claim 1, wherein said limiter includes a tracking curve changer which changes the tracking curve to be referred to by said second changer to a predetermined tracking curve.

6. An electronic camera according to claim 1, further comprising a setter which executes a process of setting the distance from the focus lens to the imaging surface to a predetermined distance in association with a limiting process of said limiter.

7. A computer program embodied on a non-transitory computer readable medium in order to control an electronic camera provided with an imager having an imaging surface which captures a scene through a zoom lens and a focus lens, the program configured to cause said electronic camera to perform the steps comprising:
   a first changing step of changing a distance from the zoom lens to the imaging surface in response to a zoom operation by an operator;
   a second changing step of executing a process of changing the distance from the focus lens to the imaging surface by referring to a tracking curve, in parallel with a changing process of said first changing step;
   a limiting step of limiting a changing process of said second changing step when a changing amount by said first changing step has exceeded a threshold value;
   an adjusting step of adjusting the distance from the focus lens to the imaging surface into a distance equivalent to a focal point based on an image outputted from said imager after the zoom operation has been canceled; and
   an updating step of updating the tracking curve to be referred to by said second changing step based on the distance defined by said first changing step and the distance defined by said adjusting step, wherein said limiting step includes an accumulating step of accumulating the changing amount in parallel with the changing process of said first changing step, and a comparing step of comparing an accumulated value calculated by said accumulating step with the threshold value.

8. A focal control method executed by an electronic camera provided with an imager having an imaging surface which captures a scene through a zoom lens and a focus lens, the focal control method comprising:
   a first changing step of changing a distance from the zoom lens to the imaging surface in response to a zoom operation by an operator;
   a second changing step of executing a process of changing the distance from the focus lens to the imaging surface by referring to a tracking curve, in parallel with a changing process of said first changing step;
   a limiting step of limiting a changing process of said second changing step when a changing amount by said first changing step has exceeded a threshold value;
   an adjusting step of adjusting the distance from the focus lens to the imaging surface into a distance equivalent to a focal point based on an image outputted from said imager after the zoom operation has been cancelled; and
   an updating step of updating the tracking curve to be referred to by said second changing step based on the distance defined by said first changing step and the distance defined by said adjusting step, wherein said limiting step includes an accumulating step of accumulating the changing amount in parallel with the changing process of said first changing step, and a comparing step of comparing an accumulated value calculated by said accumulating step with the threshold value.

9. An electronic camera according to claim 1, wherein said limiter further includes an initializer which initializes the accumulated value calculated by said accumulator every time the zoom operation is canceled.

10. An electronic camera according to claim 1, further comprising a controller which activates said limiter when a change direction by said first changer is equivalent to a tele direction whereas stops said limiter when the change direction by said first changer is equivalent to a wide direction.

11. An electronic camera according to claim 1, wherein said limiting step further includes an initializing step of initializing the accumulated value calculated by said accumulating step every time the zoom operation is canceled.

12. An electronic camera according to claim 7, wherein said limiting step further includes an initializing step of initializing the accumulated value calculated by said accumulating step every time the zoom operation is canceled.

13. An electronic camera, comprising:
an imager having an imaging surface which captures a scene through a zoom lens and a focus lens;
a first changer which changes a distance from the zoom lens to the imaging surface in response to a zoom operation by an operator;
a second changer which executes a process of changing the distance from the focus lens to the imaging surface by referring to a tracking curve, in parallel with a changing process of said first changer;
a limiter which limits a changing process of said second changer when a changing manner performed by said first changer satisfies a predetermined condition under which a moving direction of said zoom lens is towards a tele direction and a moving amount of said zoom lens towards said tele direction exceeds a threshold value calculated by adding up a plurality of the moving amount towards said tele direction of the zoom lens;
an adjustor which adjusts the distance from the focus lens to the imaging surface into a distance equivalent to a focal point based on an image outputted from said imager after the zoom operation has been cancelled; and
an updater which updates the tracking curve to be referred to by said second changer based on the distance defined by said first changer and the distance defined by said adjuster.

14. A computer program embodied on a non-transitory computer-readable medium in order to control an electronic camera provided with an imager having an imaging surface which captures a scene through a zoom lens and a focus lens, the program configured to cause said electronic camera to perform the steps comprising:
a first changing step of changing a distance from the zoom lens to the imaging surface in response to a zoom operation by an operator;
a second changing step of executing a process of changing the distance from the focus lens to the imaging surface by referring to a tracking curve, in parallel with a changing process of said first changing step;
a limiting step of limiting a changing process of said second changing step when a changing manner performed by said first changing step satisfies a predetermined condition under which a moving direction of said zoom lens is towards a tele direction and a moving amount of said zoom lens towards said tele direction exceeds a threshold value calculated by adding up a plurality of the moving amount towards said tele direction of the zoom lens;
an adjusting step of adjusting the distance from the focus lens to the imaging surface into a distance equivalent to a focal point based on an image outputted from said imager after the zoom operation has been cancelled; and
an updating step of updating the tracking curve to be referred to by said second changing step based on the distance defined by said first changing step and the distance defined by said adjusting step.

15. A focal control method executed by an electronic camera provided with an imager having an imaging surface which captures a scene through a zoom lens and a focus lens, the focal control method comprising:
a first changing step of changing a distance from the zoom lens to the imaging surface in response to a zoom operation by an operator;
a second changing step of executing a process of changing the distance from the focus lens to the imaging surface by referring to a tracking curve, in parallel with a changing process of said first changing step;
a limiting step of limiting a changing process of said second changing step when a changing manner performed by said first changing step satisfies a predetermined condition under which a moving direction of said zoom lens is towards a tele direction and a moving amount of said zoom lens towards said tele direction exceeds a threshold value calculated by adding up a plurality of the moving amount towards said tele direction of the zoom lens;
an adjusting step of adjusting the distance from the focus lens to the imaging surface into a distance equivalent to a focal point based on an image outputted from said imager after the zoom operation has been cancelled; and
an updating step of updating the tracking curve to be referred to by said second changing step based on the distance defined by said first changing step and the distance defined by said adjusting step.

* * * * *